No. 819,701. PATENTED MAY 1, 1906.
E. FOWLER.
BEARING AND SCRAPER FOR DISK PLOWS.
APPLICATION FILED OCT. 30, 1905.
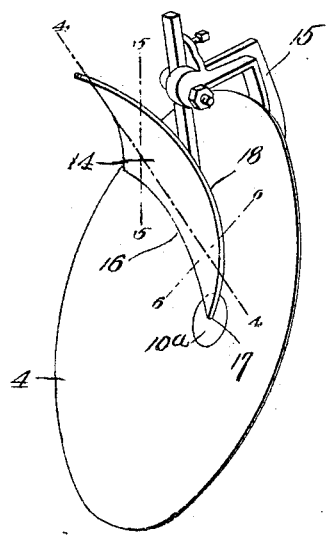
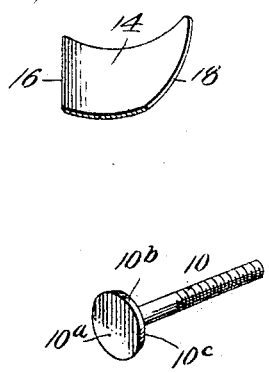
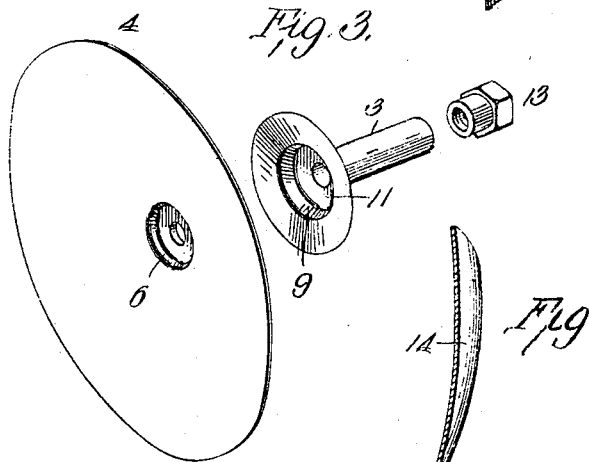
Witnesses
C. W. Holmes
H. H. Simms
Inventor
Edward Fowler
By Knight Bros.
Attorneys

UNITED STATES PATENT OFFICE.

EDWARD FOWLER, OF CEDAR GROVE, GEORGIA, ASSIGNOR OF ONE-FOURTH TO ADOLPHUS L. FOWLER, ONE-TWELFTH TO OTY T. SIMMONS, ONE-TWELFTH TO JESSEY L. SIMMONS, AND ONE-TWELFTH TO BYRON V. KELL, OF CEDAR GROVE, GEORGIA.

BEARING AND SCRAPER FOR DISK PLOWS.

No. 819,701.  Specification of Letters Patent.  Patented May 1, 1906.

Original application filed August 2, 1905, Serial No. 272,382. Divided and this application filed October 30, 1905. Serial No. 285,072.

*To all whom it may concern:*

Be it known that I, EDWARD FOWLER, a citizen of the United States, residing at Cedar Grove, in the county of Walker, State of Georgia, have invented certain new and useful Improvements in Bearings and Scrapers for Disk Plows, of which the following is a specification.

This invention relates to bearings and scrapers for rotary disks of plows, cultivators, and other agricultural machines.

It has for one of its objects to provide means for securing together the spindle and the disk so that they will not separate or be torn apart when the disk meets a rock, a stump of a tree, or other obstruction.

A further object is to provide a scraper for concave rotary cutting-disks so constructed that the soil is easily received from the disk without breaking the swirl, thereby giving a light draft and brisk turning of the dirt and scouring the entire face of the scraper.

Other and further objects will appear in the following description and will be more particularly pointed out in the appended claims.

In the drawings, Figure 1 is a perspective view showing the scraper mounted in position. Fig. 2 is a section through the disk. Fig. 3 is a separated perspective view of the spindle and the disk. Figs. 4, 5, and 6 are respectively sections on lines 4 4, 5 5, and 6 6 of Fig. 1. Fig. 7 is a view showing the scraper in plan.

The bearing herein shown and described was divided out of my application on a disk plow filed August 2, 1905, Serial No. 272,382, and comprises a concavo-convex disk 4 and a spindle 3. The disk is made of sheet metal and is provided with a central tapering open boss 5, depressed rearwardly from the metal and having at its base an inwardly-extending annular flange 6. Within the boss is fitted the head of a bolt 10, the head having a concave top 10$^a$, tapering side walls 10$^b$, and a flat under surface 10$^c$ to bear against the spindle 3. The spindle 3 is bored axially to receive the shank of the bolt 10 and at one end is provided with an enlargement providing a seat having a flat bottom 11 and flared side walls 9, the edge of the enlargement or the rim surrounding the seat being curved to conform to the rear face of the disk surrounding the boss. By this construction the annular flange 6 is clamped between the flat under face of the bolt and the flat bottom of the seat at the end of the spindle, thereby preventing the spindle separating from the disk when the disk strikes a rock, a stump of a tree, or other obstruction. The spindle 3 and bolt 10 are held together by a nut 13.

The scraper 14 is suitably supported by a bracket 15 and is formed from a single sheet of metal having a straight edge 16 to form the scraping edge of the scraper and a pointed end 17 to extend to the axis of the disk and gradually curved at 18 from the pointed end. This sheet of metal is concaved in a direction transverse to the straight edge, so that the edge will conform to the concave of the disk. It is further concaved in a direction approximately parallel to the scraping edge, this concave gradually becoming greater from the pointed end, where the scraper is approximately flat. Any section of the scraper transverse of the curved scraping edge is formed on a curve all parts of which from said curved edge to the opposite edge have the same center.

Having thus described my invention, what I claim is—

1. The combination with a disk-plow spindle having a central bore, of a plow-boss seat at one end of the spindle, having a flat bottom, and a bolt fitted in the central bore of the spindle and having a head with a flat under surface, said head being of a size to clamp a plow-boss between the walls of the plow-boss seat and the side walls and bottom of the said head.

2. The combination of a plow-disk having a central open boss, with an inwardly-extending annular flange at the base of the boss, a spindle provided with a central bore and a seat at one end to receive the boss, said seat having a flat bottom, and a bolt fitted through the perforated boss and the spindle and having a head seated within the boss and provided with a flat under surface.

3. The combination of the disk having a rearwardly-extending tapering open boss, and an inwardly-extending flange at the rear end of the boss; a bolt having a head provided with tapering side walls and a flat under surface, said bolt projecting from the rear of the disk and having its head fitting within the boss; and a spindle receiving the projecting end of the boss, and provided with a seat at one end receiving the tapering boss, said seat having a flat bottom wall and its rim curved to conform to the portion of the disk surrounding the boss, the flange being clamped between the flat bottom wall of the seat and the flat under face of the bolt-head.

4. A sheet-metal scraper for concave disks, provided with a pointed end, concaved in a direction to provide a curved scraping edge conforming to the concavity of the disk, and concaved in a direction approximately parallel to the curved edge, the curvature of the latter concave increasing from the pointed end of the scraper, and any section of the scraper transverse of the scraping edge being formed on a curve, all parts of said curve from the curved edge to the opposite edge having the same center.

The foregoing specification signed this 24th day of October, 1905.

EDWARD FOWLER.

In presence of—
W. P. FRAZIER,
J. M. MATHIS.